US008349160B2

(12) United States Patent
Medoro et al.

(10) Patent No.: US 8,349,160 B2
(45) Date of Patent: Jan. 8, 2013

(54) METHOD AND APPARATUS FOR THE MANIPULATION OF PARTICLES IN CONDUCTIVE SOLUTIONS

(75) Inventors: Gianni Medoro, Casalecchio di Reno (IT); Nicolò Manaresi, Bolonga (IT)

(73) Assignee: Silicon Biosystems S.p.A., Bologna (IT)

( * ) Notice: Subject to any disclaimer, the term of this patent is extended or adjusted under 35 U.S.C. 154(b) by 738 days.

(21) Appl. No.: 12/091,367

(22) PCT Filed: Oct. 23, 2006

(86) PCT No.: PCT/IB2006/002965
§ 371 (c)(1),
(2), (4) Date: Oct. 10, 2008

(87) PCT Pub. No.: WO2007/049120
PCT Pub. Date: May 3, 2007

(65) Prior Publication Data

US 2009/0218221 A1 Sep. 3, 2009

(30) Foreign Application Priority Data

Oct. 24, 2005 (IT) .............................. BO2005A0643

(51) Int. Cl.
*B01D 57/02* (2006.01)

(52) U.S. Cl. ........................................ 204/547; 204/643

(58) Field of Classification Search .................. 204/547, 204/549, 643, 645
See application file for complete search history.

(56) References Cited

U.S. PATENT DOCUMENTS

| | | | | |
|---|---|---|---|---|
| 6,203,683 | B1 | 3/2001 | Austin et al. | |
| 6,824,664 | B1 | 11/2004 | Austin et al. | |
| 6,888,721 | B1 * | 5/2005 | Moghaddam et al. | 361/700 |
| 7,307,328 | B2 * | 12/2007 | Meyer et al. | 257/467 |
| 2002/0031838 | A1 * | 3/2002 | Meinhart et al. | 436/514 |
| 2004/0011652 | A1 | 1/2004 | Bressler | |

(Continued)

FOREIGN PATENT DOCUMENTS

DE 3931851 A1 4/1991

(Continued)

OTHER PUBLICATIONS

International Search Report and Written Opinion for corresponding International Application No. PCT/IB2006/002965, dated Jun. 15, 2007.

*Primary Examiner* — J. Christopher Ball
(74) *Attorney, Agent, or Firm* — Marshall, Gerstein & Borun LLP

(57) ABSTRACT

The present invention relates to an apparatus and method for manipulation and/or position control of particles by means of force fields of electrical nature in electrically conductive solutions, wherein power dissipated by Joule effect, which may cause the death of biological specimens under examination, is advantageously removed. The apparatus comprises a first substrate, upon which lies an array of electrodes, the application of a set of electric voltages to the electrodes generating a force field; a second substrate at a distance from, and parallel to, the first substrate so as to delimit a microchamber within which a liquid containing the particles is inserted; and cooling means for extracting an appropriate amount of heat from the microchamber, the cooling means comprising a second microchamber made in contact with, or by means of, the first or second substrate and through which a flow of cooling liquid or gas is pumped.

16 Claims, 5 Drawing Sheets

U.S. PATENT DOCUMENTS

| | | | | |
|---|---|---|---|---|
| 2004/0055891 | A1 | 3/2004 | Pamula et al. | |
| 2004/0063196 | A1 | 4/2004 | Muller et al. | |
| 2005/0214736 | A1 | 9/2005 | Childers et al. | |
| 2006/0228749 | A1 | 10/2006 | Wang et al. | |
| 2008/0264068 | A1 * | 10/2008 | Nakasuka et al. | 62/3.3 |

FOREIGN PATENT DOCUMENTS

| | | | |
|---|---|---|---|
| DE | 19500660 | A1 | 6/1996 |
| WO | WO-00/28313 | A1 | 5/2000 |
| WO | 0069565 | A1 | 11/2000 |
| WO | WO-02/12896 | A1 | 2/2002 |

* cited by examiner

METHOD AND APPARATUS FOR THE MANIPULATION OF PARTICLES IN CONDUCTIVE SOLUTIONS

CROSS REFERENCES TO RELATED APPLICATIONS

This application is a U.S. National Phase Application under 35 USC §371 of International Application PCT/IB2006/002965 filed on 23 Oct. 2006 designating the United States, which claims priority to Italian Application No. BO2005A000643, filed Oct. 24, 2005. Priority to each of the foregoing PCT and Italian national applications is claimed herein under all applicable laws and provisions, and each of said priority applications is incorporated by reference in its entirety.

TECHNICAL FIELD

The present invention relates to methods and apparatuses for manipulation of particles in conductive or highly conductive solutions. The invention finds application principally in the implementation of biologic protocols on cells.

TECHNOLOGICAL BACKGROUND

The patent PCT/WO 00/69565 filed in the name of G. Medoro describes an apparatus and method for manipulation of particles via the use of closed dielectrophoretic-potential cages. The force used for maintaining the particles in suspension or for moving them within the microchamber dissipates, by the Joule effect, a power that is proportional to the square of the amplitude of the voltages applied and increases linearly as the electric conductivity of the suspension liquid increases, causing an uncontrolled increase in temperature within the microchamber. The individual control on the operations of manipulation may occur via programming of memory elements and circuits associated to each element of an array of electrodes integrated in one and the same substrate. Said circuits contribute to the increase in temperature by dissipating power in the substrate that is in direct contact with the suspension liquid. There follows an important limitation due to the death of the particles of biological nature present in the specimen for solutions with high electric conductivity limiting the application of said methods and apparatuses to the use of beads or non-living cells.

An example of apparatus that implements said method is represented in FIG. 1, shown in which is the electric diagram of the circuits dedicated to each element of an array of microsites (MS) and the signals for enabling driving thereof. The manipulation of particles is obtained by means of an actuation circuit (ACT) for appropriately driving an electrode (EL), to each electrode of the array there being moreover associated a circuit (SNS) for detection of particles by means of a photodiode (FD).

The limitations of the known art are overcome by the present invention, which enables manipulation of biological particles by means of the described technique of the known art preserving the vitality and biological functions irrespective of the forces used and/or of the conductivity of the suspension liquid. In addition to the possibility of manipulation of living cells, the present invention teaches how to reduce the power consumption and how to maximize the levels of performance of said devices given the same power consumption.

SUMMARY OF THE INVENTION

The present invention relates to a method and apparatus for manipulation and/or control of the position of particles by means of fields of force of an electrical nature in electrically conductive solutions. The fields of force can be of (positive or negative) dielectrophoresis, electrophoresis, electrohydrodynamics, or electrowetting on dielectric, characterized by a set of points of stable equilibrium for the particles. Each point of equilibrium can trap one or more particles within the attraction basin. Said forces dissipate, by the Joule effect, an amount of power that increases with the square of the voltages applied and increases linearly with the conductivity of the liquid, causing in a short time lysis of the cells contained in the specimen. According to the present invention, the dissipated power can be removed through at least one of the substrates in contact with the suspension liquid in order to maintain the temperature constant or reduce it throughout the step of application of the forces in a homogeneous or selective way, that is constant or variable in time. In this connection, the system can benefit from the use of one or more integrated or external sensors for control of the temperature by means of a feedback control. Reading of the temperature can occur, according to the present invention, using the same read circuit of the optical sensor by reading the output signal of the sensor during the reset step so as to have a signal equal to the threshold voltage, which depends upon the temperature. In a second embodiment of the method, a flow constantly replaces the buffer, transporting and removing the heat by convention outside the microchamber. Forming the subject of the present invention is likewise a method for minimizing the dissipated power given the same levels of performance, dividing the forces into classes, falling within one of which classes are the forces for controlling the particles in a static way, whilst falling within a further class are the forces necessary for displacement of particles. This can occur in a practical way by increasing the number of potentials that supply the electrodes of the device or else by appropriately modulating the amplitudes of the phases applied during displacement of the cages or by means of a timed management of the amplitudes of the voltages.

Forming the subject of the present invention are likewise some practical implementations of the method through which apparatuses for manipulation of particles in conductive solutions are realized. Said apparatus requires the use of a heat pump, which can be obtained by means of a Peltier-effect device or by means of the convective transport of the heat flow absorbed by the substrate. Said convective flow uses a liquid or a gas and requires a second microchamber. Forming the subject of the present invention is likewise an apparatus that exploits the gas law for reducing the temperature by means of variation of the pressure of the gas having the function of performing convective transport or by means of a change of phase from vapour to liquid and vice versa.

DESCRIPTION OF THE INVENTION

In what follows, the term “particles” will be used to designate micrometric or nanometric entities, whether natural or artificial, such as cells, subcellular components, viruses, liposomes, niosomes, microbeads and nanobeads, or even smaller entities such as macro-molecules, proteins, DNA, RNA, etc., such as drops of unmixable liquid in the suspension medium, for example oil in water, or water in oil, or even drops of liquid in a gas (such as water in air) or droplets of gas in a liquid (such as air in water). The symbols VL or VH will moreover designate as a whole two different sets of signals, each containing the voltages in phase (Vphip) or phase opposition (Vphin) necessary for enabling actuation according to the known art.

DETAILED DESCRIPTION

The aim of the present invention is to provide a method and an apparatus for manipulation of particles in highly conductive solutions. By "manipulation" is meant control of the position of individual particles or groups of particles or displacement in space of said particles or groups of particles.

The method is based upon the use of a non-uniform field of force (F) via which individual particles or groups of particles are attracted towards positions of stable equilibrium (CAGE). Said field of an electrical nature generates heat (Q0) by the Joule effect, which typically has one or more of the following consequences:

1. damage of the cell membrane or of the organelles;
2. lysis and death of the cell;
3. uncontrolled onset of disturbance of a thermal nature such as electrohydrodynamic (EHD) or Brownian motion.

Generation of the Forces

Figure 1:
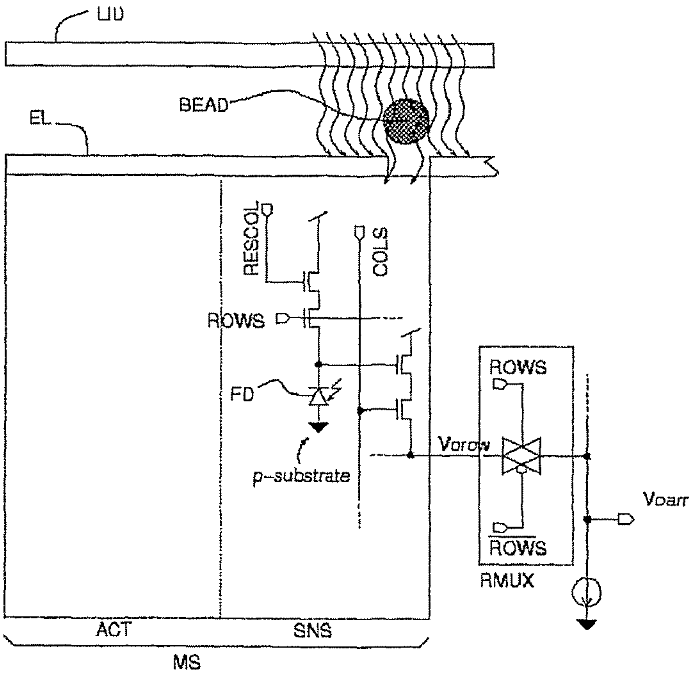
FIG. 1 shows the circuits for actuation and optical reading associated to each element of an array of microsites.

There currently exist various methods for generation of forces for displacing particles, according to the known art, by means of arrays of electrodes (EL) provided on a substrate (SUB1). Typically a lid (LID) is used, which can in turn be an electrode. The substrate (SUB1) and the lid (LID) delimit, respectively from beneath and from above, a microchamber (M), within which the particles (BEAD) in suspension liquid (S) are found. In the case of DEP, the voltages applied are periodic voltages in phase (Vphip), designated by the symbol of addition (+), and in phase opposition (Vphin), designated by the symbol of subtraction (−). By "voltages in phase opposition" are meant voltages 1800 out of phase. The field generates a force, which acts on the particles, attracting them towards points of equilibrium (CAGE). In the case of negative DEP (NDEP), it is possible to provide closed cages of force, according to the known art, if the lid (LID) is a conductive electrode. In this case, the point of equilibrium (CAGE) is provided in a position corresponding to each electrode connected to Vphin (−) if the adjacent electrodes are connected to the opposite phase Vphip (+) and if the lid (LID) is connected to the phase Vphin (−). Said point of equilibrium (CAGE) is normally set at a distance in the liquid with respect to the electrodes so that the particles (BEAD) are, in the stationary state, undergoing levitation. In the case of positive DEP (PDEP), the point of equilibrium (CAGE) is normally found in a position corresponding to the surface on which the electrodes are provided, and the particles (BEAD) are, in the stationary state, in contact therewith. An example of apparatus that implements said method is represented in FIG. 1, which shows the electric diagram of the circuits dedicated to each element of an array of microsites (MS) and the signals for enabling driving thereof. The manipulation of particles is obtained by means of an array of microsites (MS), each of which contains an actuation circuit (ACT) having the function of controlling the voltages necessary for driving appropriately an electrode (EL); moreover associated to each microsite of the array is a circuit (SNS) for detection of particles by means of a photodiode (FD) integrated in the same substrate (SUB1).

For reasons of simplicity, in what follows use will be considered, purely by way of example, without, however, in no way limiting the purposes of the present invention, of closed cages of negative dielectrophoresis (NDEP) as force of actuation for describing the methods and apparatuses (for this reason it is necessary to use a lid that functions as electrode), since in highly conductive solutions the biological particles have a behaviour almost exclusively of negative dielectrophoresis. To persons with ordinary skill in the sector it is evident how it is possible to generalize the methods and apparatuses described hereinafter for use of different forces of actuation and different types of particles.

Displacement of the Cages

By controlling the phases of the voltages applied to the electrodes, it is possible by displacing the position of the points of attraction (CAGE) entraining the particles (BEAD) trapped therein. It is evident to persons skilled in the sector that the rate of displacement increases as the voltage applied increases so that it is advantageous to use high voltages, associated to which is, however, a higher power dissipation, which is frequently intolerable for the purposes of manipulation of biological organisms.

Control of the Temperature by Means of a Heat Pump

Figure 2:
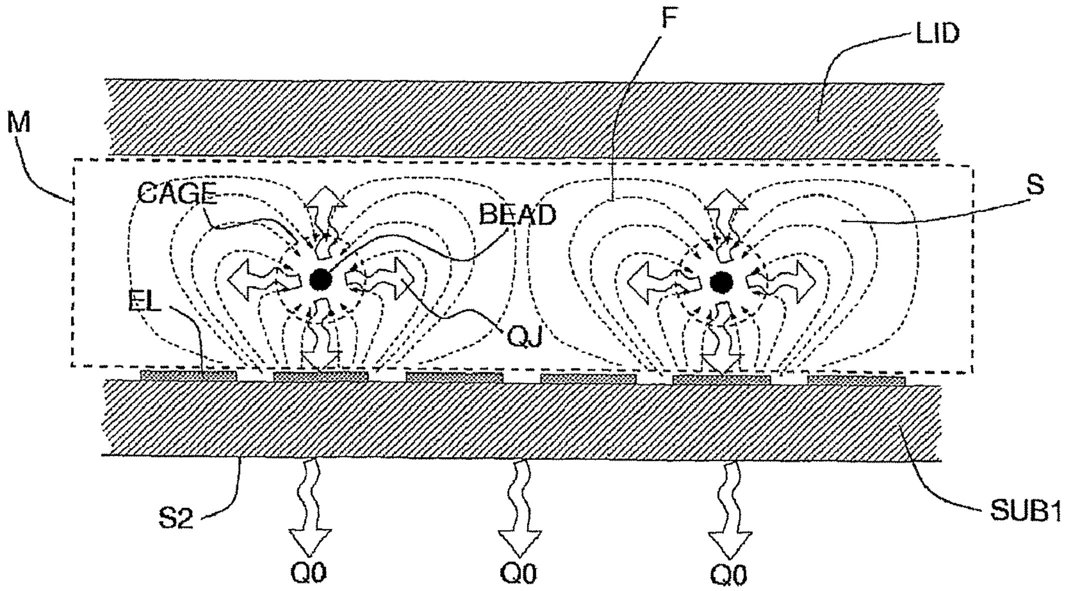
FIG. 2 shows a cross-sectional view of a generic device, generation of the field of force associated to the generation of heat, and the working principle of heat removal through the heat-exchange surface of a substrate.

An embodiment of the method according to the present invention is shown in FIG. 2. A microchamber (M) is enclosed between a first substrate (SUB1), lying on which is an array of electrodes (EL), and a second substrate (LID). The specimen constituted by particles (BEAD) suspended in an electrically conductive liquid (S) is introduced within the microchamber. By applying appropriate electrical stimuli according to the known art, dielectrophoresis cages (CAGE) are obtained as shown in FIG. 2. Said cages represent the point in which the lines of force (F) terminate. The presence of electric fields generates in the liquid a rise in temperature as a consequence of the generation of heat (QJ) due to the dissipation of power by the Joule effect. The method according to the present invention envisages removal of an amount of heat (Q0) through one or more substrates (SUB1). For this purpose, the heat (Q0) is extracted using a surface of exchange (S2) belonging to said substrate (SUB1), but differing from the surface contacting with the liquid.

Various Conditions May Arise According to the Ratio Between Q0 and QJ:

1. increase in temperature: during an initial time interval the heat Q0 is equal to Q01 and smaller than QJ, whilst for time intervals subsequent to t1 the heat Q0 is equal to Q02 and substantially equal to QJ; in this case, the temperature increases during said first time interval and is stabilized to a steady-state value T2 higher than the initial temperature T in the intervals subsequent to t1;
2. constant temperature: in the case where the heat extracted Q0 is equal instant by instant to the generated heat QJ for the entire duration of the application of the forces the mean temperature remains substantially unvaried and equal to the initial temperature T;
3. reduction in temperature: in the case where, during a first time interval, the heat Q0 is equal to Q01 and higher than QJ whilst, for time intervals subsequent to t1, the heat Q0 is equal to Q02 and equal to QJ, the temperature decreases during said first time interval and is stabilized to a steady-state value T2 lower than that of the initial temperature T in the intervals subsequent to t1.

The possible conditions illustrated previously refer to the particular case where the power dissipation QJ is homogeneous in space. In the more general case, the power QJ can vary point by point in the microchamber, and consequently the removal of heat Q0 can be obtained in different ways in order to achieve different results; by way of example that in no way limits the purposes of the present invention we can list two different situations:

1. Q0 homogeneous over the entire surface S2; in this case, the temperature within the microchamber will be proportional point by point to the value of QJ in a neighbourhood of the same point;
2. Q0 equal point by point to QJ; in this case, the temperature within the microchamber will tend to become uniform.

The extraction of heat (Q0) can occur in different ways according to the present invention and will be described in the next sections.

Control of the Temperature by Means of a Heat Pump and Temperature Sensor

Forming the subject of the present invention is also the use of a technique for controlling the temperature of the liquid based upon the use of a heat pump (PT), the ability of which of extracting heat (Q0) is evaluated instant by instant on the basis of the information coming from one or more temperature sensors (TS) inside the microchamber, integrated within the substrate or external thereto. In this connection, a control system (C) receives and processes the information coming from the sensor (TS) and determines the operating conditions of the heat pump (PT), as shown by way of example in FIG. 6.

Reading of the Temperature by Means of the Read Circuit of a Photodiode

Forming the subject of the present invention is likewise a method for reading the temperature by means of the read circuit of a photodiode (FD) integrated in the same substrate (SUB1). According to the present invention, reading of the temperature occurs in an indirect way by reading the voltage at output from the read circuit of the photodiode during the reset step so as to detect a threshold voltage that depends upon the temperature. In this connection, in a read scheme as the one shown in FIG. 1, it is sufficient to read the output (Voarr) by scanning the columns of each row, having addressed the row and column via ROWS (row sense) and COLS (column sense), and maintaining RESCOL active (high). Reading each element of each row is performed in this particular case in a serial way by means of a multiplexer (RMUX).

Control of the Temperature by Means of Buffer Flow

Figure 3:
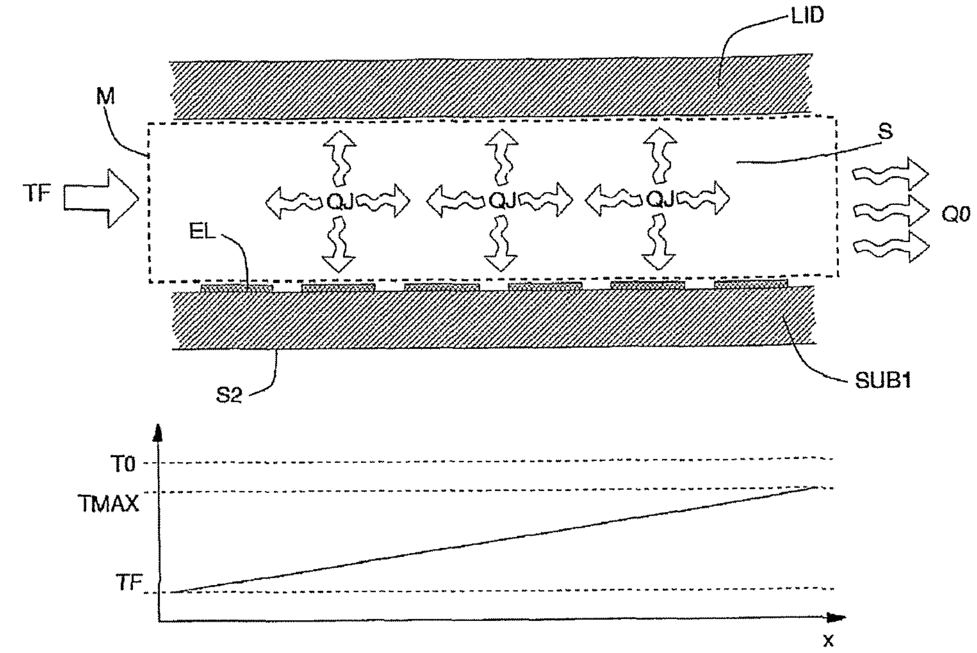
FIG. 3 shows the working principle of the method for removal of heat through a flow of solution at a controlled temperature within the microchamber.

A further embodiment of the method according to the present invention is shown in FIG. 3. In this case, the removal of heat (QJ) generated within the liquid (S) occurs by convection causing the liquid (S) itself at temperature TF to flow within the microchamber (M). The force of entrainment by viscous friction in this case must be smaller than the electric force (F) that controls the position of the particles (BEAD). The temperature within the liquid in this case is not homogeneous in space and depends upon the distance with respect to the point in which the cooling liquid (S) is introduced, as shown in FIG. 3. The maximum temperature (TMAX) within the microchamber depends upon the heat generated (Q0), the temperature (TF), and the speed of the liquid (S). The liquid (S) can be made to circulate by means of a closed circuit or else an open circuit; in the case where a closed circuit is used, said liquid (S) must be cooled before being introduced within the microchamber (M) again.

Minimization of the Power Dissipation

Forming the subject of the present invention is also a method for reducing the dissipation of power given the same levels of performance, where by "performance" is meant the rate of displacement of particles by means of the applied forces F. In this connection, it is necessary to point out that a large number of protocols of biological interest envisage non-simultaneous displacement of all the particles. In this case, two different classes of electrodes may be distinguished:

1. electrodes for control of the static position of particles that belong to a first class (SE1) and are stimulated by means of a first set of signals (VL) for providing static cages (CAGE1), the position (XY11) of which remains unvaried;
2. electrodes for displacement of particles that belong to a second class (SE2) and are stimulated by means of a second set of signals (VH) for providing dynamic cages (CAGE2), the position (XY21) of which is modified.

Figure 4:
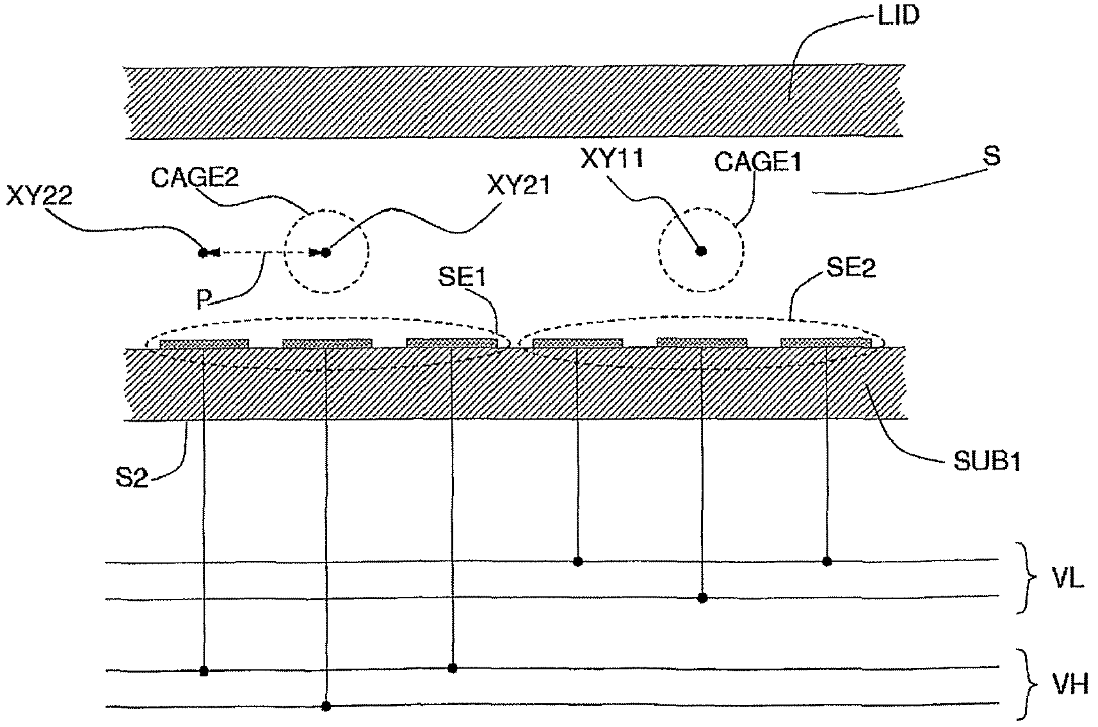
FIG. 4 shows the principle of reduction of the dissipated power via the use of classes of electrodes.

FIG. 4 shows an example of this idea. The electrodes belonging to the class (SE2) are used for displacing the cages (CAGE2) from the initial position (XY21) to the final position (XY22) typically at a distance (P) equal to the pitch between adjacent electrodes. According to the nature of the stimuli applied to the two sets of signals (SE1 and SE2), it is possible to make available various methods in order to reduce the power dissipation in the liquid given the same rate of displacement or to increase the rate of displacement given the same total power dissipation.

Use of Constant Signals

The simplest method forming the subject of the present invention is to use for the signals belonging to VH amplitudes that are greater than the ones used for the signals belonging to VL. In fact, maintaining a particle trapped in a static way in a point of stable equilibrium (CAGE1) requires less power than that required for displacing it from a position (XY21) of stable equilibrium (CAGE2) to the adjacent one (XY22), and consequently lower voltages can be used for all the static cages (CAGE1). Whether the electrodes (EL) belong to one of the classes (SE1 or SE2) can be modified in time according to the type of displacement and to the cages involved in said displacement, so that cages (CAGE1) that are static in a first transient can become dynamic (CAGE2) in a subsequent transient, or vice versa.

Amplitude Modulation of the Potentials

Figure 7:
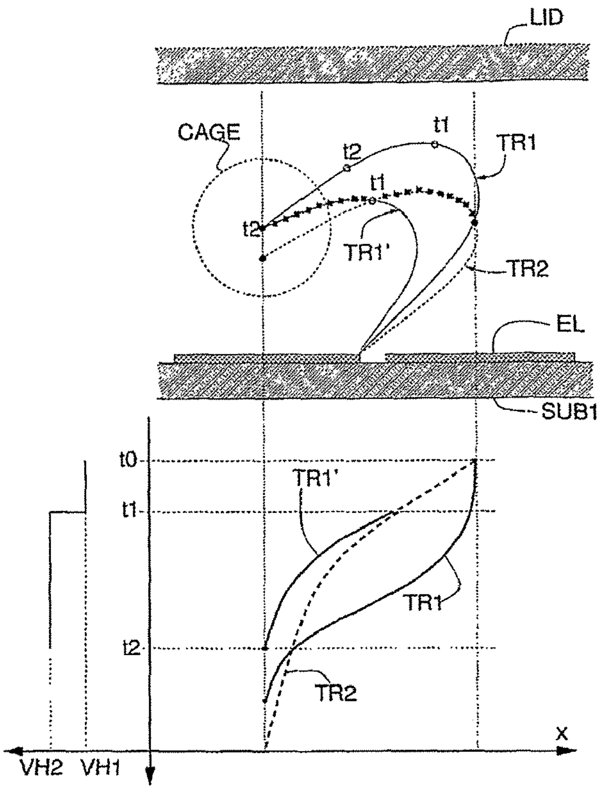
FIG. 7 shows the working principle of maximization of the levels of performance via modulation of the amplitude of the voltages applied to the electrodes during the transient that characterizes displacement of a particle.

A further technique forming the subject of the present invention can be described with the aid of FIG. 7, which is a conceptual illustration of operation in a simplified case. FIG. 7 describes by way of non-limiting example the situation in which the amplitudes of the potentials belonging to VH vary in a discrete way between just two different values VH1 and VH2 (VH1 different from VH2) during the transient in which the particle (BEAD) initially trapped in the resting position (XY21) moves towards the new destination (XY22). The length and intensity of the lines of force, i.e., of the paths followed, depend upon the potentials applied, and consequently, by acting on the potentials (VH) during the transient, it is possible to modify the line of force followed by the particle and consequently the duration of the displacement. In the particular case, three different paths (TR1, TR1' and TR2) are represented:

1. TR1 corresponds to the voltage VH1 and passes through the resting position XY21;
2. TR2 corresponds to the voltage VH2 and passes through the resting position XY21;
3. TR1' corresponds to the voltage VH1, does not pass through the resting position XY21, and crosses the path TR2 in the point reached by the particle that follows the path TR2 at the instant t1.

In order to reduce the total travelling time with respect to the travel path TR1 or TR2, it is possible to follow a path made up of broken lines of different paths for different time intervals. For example, in the case represented in FIG. 7 we can:

1. apply the voltage VH2 up to the instant t1; the particle initially follows the path TR2;
2. apply the voltage VH1 for instants subsequent to t1 up to t2; the particle follows the path TR1'.

The total time required by the particle to reach the new point of equilibrium is in this case shorter than the time required to follow entirely the path determined by application of the potential VH1 or VH2 for the entire duration of the transient. In the most general case, the voltage applied can vary in a discrete way between a generic number of values or continuously. It is evident to persons skilled in the art that it is possible to determine a temporal function that characterizes the evolution in time of the voltage that minimizes the travelling time. Said function can vary for different types of particles and can be determined experimentally or by means of numeric simulations.

Modulation in Time of the Potentials

Figure 5:
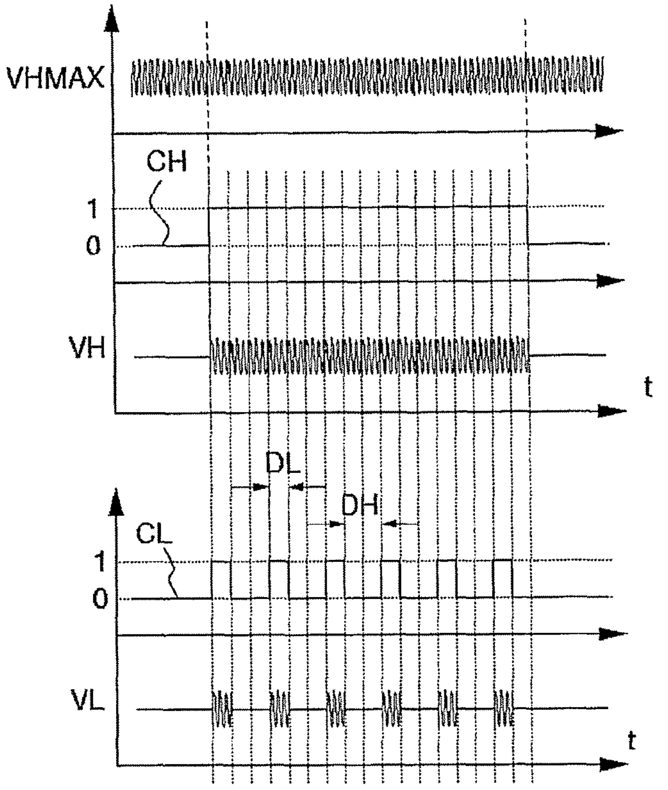
FIG. 5 shows the sequence of the amplitudes in temporal management of the voltages aimed at reduction of the dissipated power given the same levels of performance.

A further embodiment of the method according to the present invention is shown in FIG. 5. The signals VL and VH applied respectively to the first (SE1) and second (SE2) class of electrodes are made up of a succession of intervals DL in which the signal is active both for VL and for VH and intervals DH in which the signal is not active for VL but is active for VH. For VH a signal is obtained that is active throughout the transient, whilst for VL a signal is obtained that is active at intervals. Exploiting the inertia of the system constituted by the particle and the liquid that acts as low-pass filter on the dynamics, the same effect will be obtained of a signal with constant amplitude equal to the product of the amplitude of the active signal (VH) and the ratio between the duration of the interval DH and the duration of the interval DL. In this way, we can obtain the equivalent effect of low voltages for static cages (CAGE1) or high voltages for dynamic cages (CAGE2) by simply modifying the duration of the interval DH and/or DL. The frequency with which DH alternates with DL is determined by the property of inertia of the system. The advantage of this technique as compared to the previous ones is that it does not require the use of dedicated signals for low voltages (VL) and high voltages (VH). The source of the signal can remain the same for all the electrodes and equal to the maximum value VHMAX. Said signal is then applied to the dynamic cages (CAGE2) and static cages coherently with the programming CH for the dynamic cages (CAGE2) and with the programming CL for the static cages (CAGE1). Associated to each electrode is a programming signal that follows the sequence designated by CL for electrodes belonging to SE1 whilst it follows the sequence designated by CH for electrodes belonging to SE2. A zero value of CL or CH indicates absence of a signal on that given electrode, whilst a value of 1 indicates presence of the signal. In some cases, it may be preferable to use a period DL+DH longer than the reverse of the cut-off frequency of the inertia of the system made up of the particles and liquid. As a consequence of this, each particle belonging to EL1 will be subjected to local oscillations around the point of equilibrium.

Apparatus for Temperature Control by Means of Peltier-effect Cells

Figure 6:
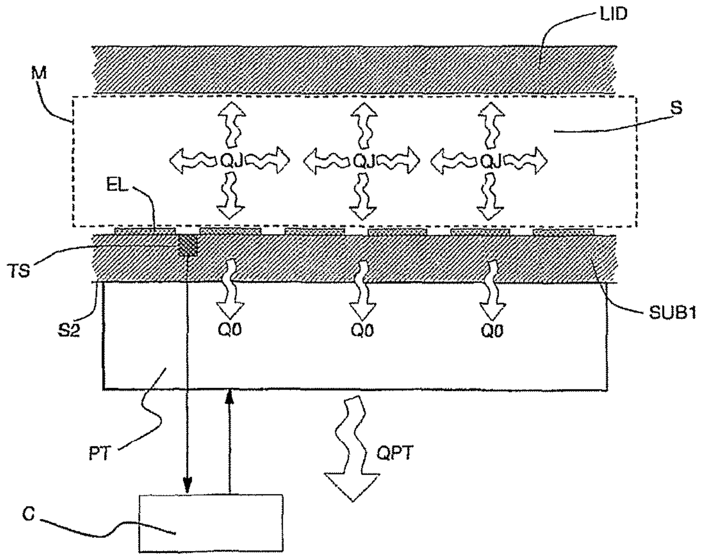
FIG. 6 shows an apparatus that uses a Peltier-effect cell for removal of the heat through a substrate and a control system based upon the measurement of the temperature within the microchamber.

Forming the subject of the present invention is also an apparatus for removal of the heat from the space inside the microchamber (M). By way of non-limiting example, some possible embodiments are provided based upon the use of Peltier-effect cells. FIG. 6 shows a possible embodiment in which the Peltier cell (PT) is in contact with the surface (S2) of the substrate (SUB1). According to the amount of heat Q0 removed and the amount of heat QJ generated, a mean temperature may be obtained in the liquid (S) equal to, lower than, or higher than, the initial temperature (T). The apparatus requires a system (not shown in the figure) for dissipating the total heat QPT consisting of the sum of the heat removed Q0 and the heat generated by the Peltier cell. This can be obtained with conventional techniques known to persons skilled in the art. The system can benefit from the use of one or more temperature sensors (TS) integrated in the substrate or inside the microchamber or external thereto for controlling, by means of an electronic control unit (C), the heat pump (PT) in order to maintain the temperature constant or increase or reduce the temperature. Processing of the information coming from the sensor and generation of the control signals for the heat pump (PT) can occur with conventional techniques commonly known to persons skilled in the art.

Apparatus for Temperature Control by Means of External Flow of Liquid or Gas

Figure 8:
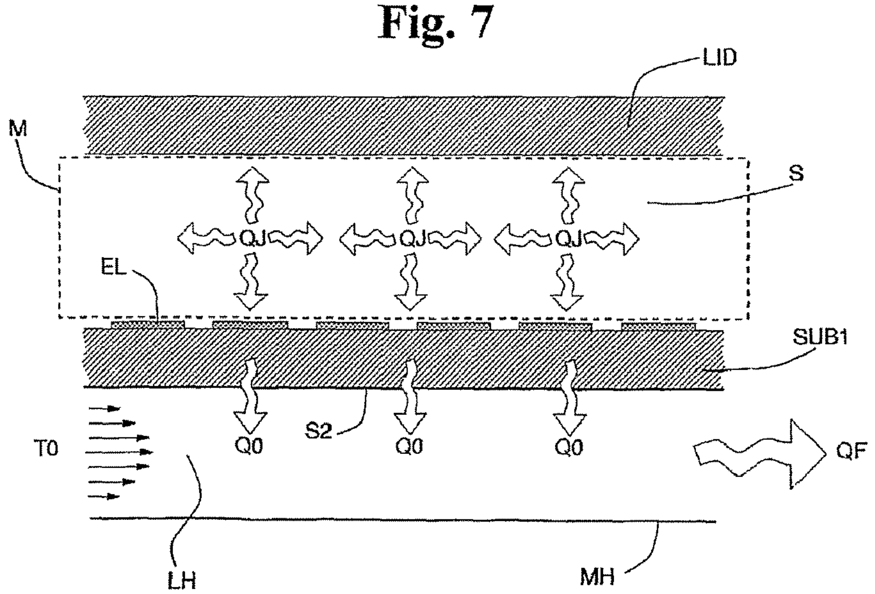
FIG. 8 shows an apparatus that uses an external flow for convective transport of the heat absorbed through a substrate.
Figure 9:
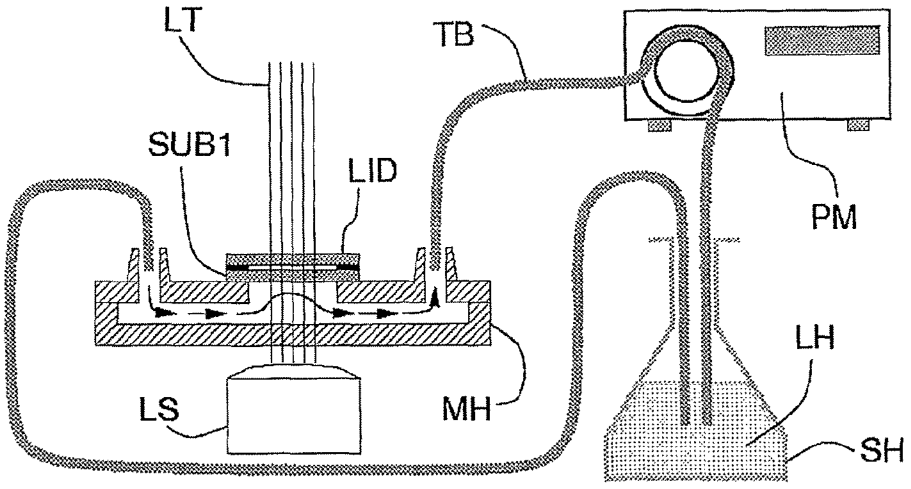
FIG. 9 shows an apparatus that maximizes the conductive and convective heat exchange between the substrate and the external flow by means of an appropriate topology of the heat-exchange surface.

Forming the subject of the present invention is also an apparatus for removal of the heat from the space inside the microchamber (M) by means of forced or natural convention. By way of non-limiting example, some possible embodiments are provided based upon the use of a liquid or gas made to flow in contact with the surface S2 of the substrate SUB1 (FIG. 8). According to the amount of heat QF removed and the amount of heat QJ generated a mean temperature may be obtained in the liquid (S) equal to, lower than, or higher than, the initial temperature (T). The amount QF of heat removed will depend upon the temperature of the liquid or gas (T0), upon the flow rate, and upon the speed of the liquid or gas. Forced convection can occur for example as shown in FIG. 9 by means of a peristaltic pump (PM), which determines the direction and speed of movement of the liquid through a fluid-dynamic circuit made using tubes (TB). The liquid is drawn from a tank (SH) and traverses the microchamber (MG) flowing in contact with the surface (S2) of the substrate (SUB1). The heat absorbed is conveyed by the liquid, which finishes up again in the same tank (SH). Various solutions are possible based upon the use of closed or open circuits in which the heat absorbed by the liquid is dissipated in the environment through appropriate dissipaters rather than in the tank, as likewise possible are solutions in which the temperature of the cooling liquid is monitored and/or controlled. Said apparatus proves particularly useful for providing transparent devices since if a transparent substrate (SUB1) and lid (LID and a transparent microchamber (MH) and cooling liquid (LH) are used, the light (LT) emitted from light source LS can traverse entirely the device for microscopy inspection based upon phase contrast for use of reversed microscopes.

Apparatus for Maximizing Convective Heat Exchange

Forming the subject of the present invention are likewise some techniques for maximizing extraction of heat by forced or natural convection.

Increase of the Exchange Surface and/or Creation of Turbulence

Figure 10:
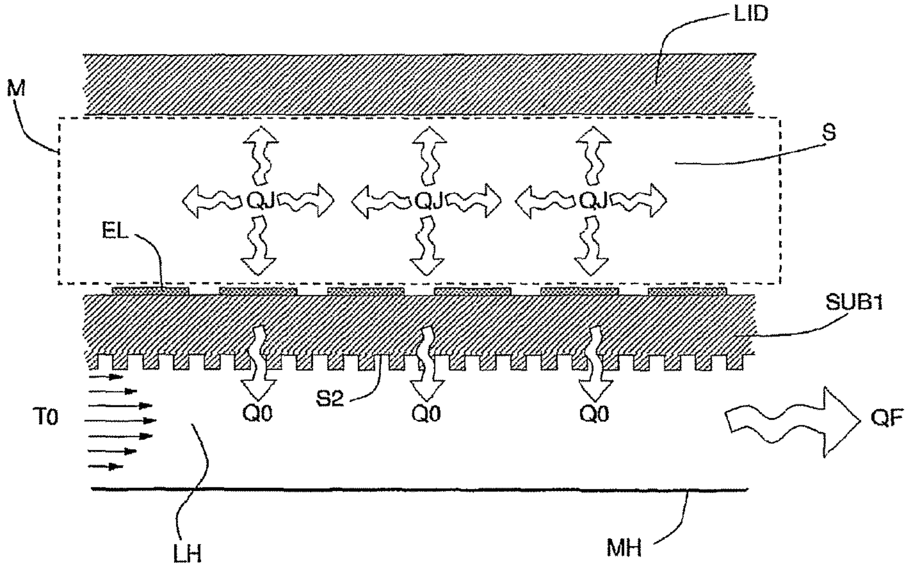
FIG. 10 shows a different embodiment of the apparatus of FIG. 8.

Convective heat exchange between one or more substrates (SUB1) and the liquid (LH) can be maximized by appropriately modifying the surface S2. By way of non-limiting example, FIG. 10 shows a possible embodiment based upon the use of tower-like projections, which have a dual effect:

1. increasing the total exchange surface; and
2. favouring onset of turbulence in the cooling liquid (LH), thus improving the heat exchange between the substrate (SUB1) and the liquid (LH).

It is evident to persons skilled in the art that different profiles for the surface S2 are possible.

Change of Phase from Liquid to Vapour

Heat exchange between the substrate (SUB1) and the cooling liquid or gas can be improved if a pressurized vapour is used so that it will condense in the proximity of the heat-exchange surface S2. In this case, the energy required for phase change is added to that due to the difference in temperature between S2 and LH.

Variation of Pressure

If gas is used, heat exchange between the substrate (SUB1) and the cooling liquid (LH) can be increased by reducing the pressure of the cooling gas in the proximity of the cooling microchamber (MH). In this way, the temperature of the gas drops, and the flow of heat Q0 absorbed by the gas increases.

The invention claimed is:

1. A method for the manipulation of particles in a conductive solution by means of a field of force wherein said field of force comprises points of stable equilibrium for said particles, said field of force being generated by means of an array of electrodes set at a distance from one another or pitch, comprising the steps of:

i. applying a first set of signals on a first sub-set of electrodes of the array of electrodes to provide first static cages having first points of stable equilibrium located in a first spatial position and applying the first set of signals on a second sub-set of electrodes of the array of electrodes to provide second static cages having second points of stable equilibrium located in a second spatial position, wherein particles trapped in the first and second static cages reside in a neighborhood of the first and second points of stable equilibrium, respectively; and ii. maintaining application of the first set of signals on said first sub-set of electrodes only, to maintain the first points of stable equilibrium of the first static cages in the first spatial position, and applying, in place of said first set of signals, a second set of signals on said second sub-set of electrodes, wherein the second static cages become dynamic cages such that said second points of equilibrium are displaced from the second spatial position to a third spatial position spaced at a distance from said second spatial position at least equal to said pitch, wherein each particle trapped in the first static cages at the first points of stable equilibrium will remain in a neighborhood of said first spatial position, while each particle trapped in the dynamic cages will be attracted towards said third spatial position.

2. The method according to claim 1, wherein said first and second sets of signals comprise potentials of constant amplitude, the amplitude of the potentials of said second set of signal being higher than that of the potentials belonging to said first set of signals.

3. The method according to claim 1, wherein the first set of signals comprises potentials of constant amplitude and the second set of signals comprises potentials of variable amplitude, wherein the variable amplitude varies when each of the particles initially trapped in the second static cages at the second spatial position move towards the third spatial position.

4. The method according to claim 1, wherein the first and second sets of signals comprise potentials of the same amplitude, the first set of signals being active at intervals, and the second set of signals being active when each of the particles initially trapped in the second static cages at the second spatial position moves towards the third spatial position.

5. An apparatus for the manipulation of particles in a conductive solution by means of a field of force, the field of force comprising points of stable equilibrium for the particles, said apparatus comprising:

i. a first substantially planar substrate and an array of electrodes disposed on the first substantially planar substrate, wherein the field of force is generated through a set of electric voltages applied to the electrodes;

ii. a second substrate spaced a distance from, and substantially parallel to, the first substrate such that a first microchamber is formed between the first and second substrates, wherein a liquid containing the particles can be inserted within the first microchamber;

iii. a heat pump for extracting an appropriate amount of heat from a surface of said first or second substrate to control the temperature of the conductive solution by dissipating at least part of the heat generated by said electrodes due to the application of said electric voltages to the electrodes; and iv. at least one temperature sensor and a control system for processing information coming from the at least one temperature sensor and for driving the extraction of heat, wherein the temperature sensor is integrated within the first substrate or within the second substrate and consists of a photodiode comprising a transistor.

6. The apparatus according to claim 5, characterized in that said cooling liquid (LH) is a liquid metal and said pump acts on said liquid by means of magnetic forces.

7. The apparatus according to claim 5, wherein said first substrate or second substrate presents in the portion in contact with said cooling liquid or cooling gas a substantially non-planar surface.

8. The apparatus of claim 7, wherein the substantially non-planar surface presents a profile that enhances a heat-exchange surface.

9. The apparatus according to claim 8, wherein said substantially non-planar surface presents a profile that enhances turbulence in the flow of said cooling liquid or cooling gas.

10. The apparatus of claim 5, wherein the temperature sensor comprises a threshold-biased transistor.

11. The apparatus of claim 5, further comprising a second microchamber made in contact with, or by means of, the first substrate or the second substrate, wherein the heat pump comprises a cooling liquid or cooling gas that flows by means of a pump through the second microchamber and in direct contact with at least a portion of the first or second substrate to extract an appropriate amount of heat from the first microchamber.

12. The apparatus according to claim 11, characterized in that said cooling liquid or cooling gas and said first substrate and second substrate and said second microchamber are substantially transparent.

13. The apparatus of claim 11, wherein the temperature of the cooling liquid or the cooling gas is controlled.

14. The apparatus of claim 13, wherein the control of the temperature of the cooling liquid or the cooling gas is performed by a Peltier-effect device.

15. The apparatus of claim 11, wherein the cooling liquid or the cooling gas is made to flow in the second microchamber, such that the pressure in the second microchamber is reduced.

16. The apparatus of claim 11, wherein the cooling liquid or the cooling gas is a vapor, wherein when the vapor flows through the second microchamber the vapor condenses on the surface of the first or second substrate, and the phase change extracts at least a portion of the heat.

* * * * *

UNITED STATES PATENT AND TRADEMARK OFFICE
CERTIFICATE OF CORRECTION

PATENT NO. : 8,349,160 B2
APPLICATION NO. : 12/091367
DATED : January 8, 2013
INVENTOR(S) : Gianni Medoro et al.

It is certified that error appears in the above-identified patent and that said Letters Patent is hereby corrected as shown below:

On the Title Page:

Item (75), "BOLONGA" should be -- BOLOGNA --.

Signed and Sealed this
Eighteenth Day of November, 2014

Michelle K. Lee

Michelle K. Lee
*Deputy Director of the United States Patent and Trademark Office*